(12) United States Patent
Clarke

(10) Patent No.: US 8,057,337 B2
(45) Date of Patent: Nov. 15, 2011

(54) DEBRIS EJECTING SPROCKET AND SYSTEM

(75) Inventor: Arthur Jack Clarke, Scotland (GB)

(73) Assignee: The Gates Corporation, Denver, CO (US)

( * ) Notice: Subject to any disclaimer, the term of this patent is extended or adjusted under 35 U.S.C. 154(b) by 479 days.

(21) Appl. No.: 12/321,247

(22) Filed: Jan. 20, 2009

(65) Prior Publication Data

US 2010/0184547 A1 Jul. 22, 2010

(51) Int. Cl.
*F16H 55/30* (2006.01)
(52) U.S. Cl. .................................. 474/152; 474/153
(58) Field of Classification Search .................. 474/152, 474/153, 158, 206
See application file for complete search history.

(56) References Cited

U.S. PATENT DOCUMENTS

| | | | |
|---|---|---|---|
| 1,937,304 A | 11/1933 | Worrall | 198/189 |
| 2,791,911 A | 5/1957 | Wasko | 74/243 |
| 3,068,711 A | 12/1962 | Even | 74/243 |
| 3,807,247 A | 4/1974 | Shiina | 74/230.05 |
| 3,868,863 A | 3/1975 | Gasner | 74/243 |
| 4,072,062 A | 2/1978 | Morling et al. | 74/243 |
| 4,143,757 A | 3/1979 | Wallenfang | 198/494 |
| 4,634,409 A * | 1/1987 | Johnson et al. | 474/152 |
| 4,687,261 A * | 8/1987 | Atkin | 305/196 |
| 4,805,388 A | 2/1989 | Kell | 56/98 |
| 7,244,205 B2 | 7/2007 | Kanaris | 474/152 |

FOREIGN PATENT DOCUMENTS

| | | |
|---|---|---|
| DE | 39 09 954 A1 | 9/1990 |
| DE | 39 18 247 A1 | 12/1990 |
| JP | 61 093654 U | 6/1986 |

* cited by examiner

*Primary Examiner* — Sang Kim
(74) *Attorney, Agent, or Firm* — Jeffrey A. Thurnau, Esq.; Thomas A. Dougherty, Esq.; Paul N. Dunlap, Esq.

(57) ABSTRACT

A debris ejecting sprocket comprising a body (100), a plurality of teeth (101) projecting from the body, a plurality of grooves (102) in alternating arrangement with the teeth, each groove receives a belt tooth, a cavity (103) disposed radially inward from each groove and communicating with the groove, the cavity further comprises a land (111) for supporting the belt, the land disposed between the groove and the cavity, and the cavity comprising a surface (104) disposed at an angle (θ) with respect to an axial direction (A-A).

9 Claims, 3 Drawing Sheets

DEBRIS EJECTING SPROCKET AND SYSTEM

FIELD OF THE INVENTION

The invention relates to a debris ejecting sprocket and system, and more particularly, to a debris ejecting sprocket having a cavity disposed radially inward from each groove and communicating with the groove, the cavity comprising a surface disposed at an angle (θ) with respect to an axial direction for ejecting debris.

BACKGROUND OF THE INVENTION

Belt driven power transmission systems are routinely used for a wide variety of applications, including automotive, agricultural, industrial, recreational and so on. The typical system comprises a toothed belt which engages a sprocket. The system allows high power transmission between the driver and the driven due to the positive mechanical engagement between the belt teeth and the sprocket grooves. Typically, the belts are subjected to a preload to assure that the teeth do not ratchet. The need for preload and proper engagement between the belt and sprocket requires that debris not be allowed to become entrapped between the belt and sprocket.

Off-road bicycles, also called mountain bikes, are used on various types of terrain in any kind of weather. In wet weather the terrain can be muddy. Mud and other debris can stick to the bike frame, tires and become entrapped in the drive train. Drive trains typically comprise chains and more recently belts.

Debris can present a problem for belt driven bikes. Mud and debris trapped between the belt and the sprocket can lead to system malfunction, belt ratcheting and premature belt failure.

Representative of the art is U.S. Pat. No. 4,805,388 (1989) which discloses a crop gathering head 10 including crop gathering belt 11, 12 of reinforced elastomeric material and its associated driving sprocket 30 and idler sheave 50 is described. The belt 11 or 12, sprocket 30 and sheave 50 system may be used to convey crops into a combine. The belt 11 or 12 includes a plurality of cleats 20 of elastomeric material on its top surface 18 and a plurality of equally spaced driving lugs 24 of elastomeric material on its bottom surface 19. The sprocket 30 has first and second sides 31, 32 respectively and comprises a plurality of equally spaced apart radially projecting teeth 33 separated by first and second cavities 34, 34' respectively. The first cavities 34 are open only to the first side 31 of the sprocket 30. The second cavities 34' are open only to the second side 32 of the sprocket 30. The depth D of each cavity exceeds the height H of each driving lug 24 of the belt 11 or 12 and the cavities 34, 34' are shaped such that foreign material, for example, corn kernels, mud and ice do not clog the driving sprockets 30 and belts 11 or 12 and disable the system. Each belt 11 or 12 is also entrained about an idler sheave 50 that includes a cylindrical hub 51 having a pair of axially spaced radially projecting flanges 52, 53 respectively thereon. The inner side surfaces 54 of the flanges 52, 53 converge in a direction toward the axis of rotation 55 of the sheave 50. Each flange 52 or 53 is interrupted in the circumferential direction of the sheave 50 to provide a self-cleaning effect upon engagement with its associated belt 11 or 12.

What is needed is a debris ejecting sprocket having a cavity disposed radially inward from each groove and communicating with the groove, the cavity comprising a surface disposed at an angle (θ) with respect to an axial direction for ejecting debris. The present invention meets this need.

SUMMARY OF THE INVENTION

The primary aspect of the invention is to provide a debris ejecting sprocket having a cavity disposed radially inward from each groove and communicating with the groove, the cavity comprising a surface disposed at an angle (θ) with respect to an axial direction for ejecting debris.

Other aspects of the invention will be pointed out or made obvious by the following description of the invention and the accompanying drawings.

The invention comprises debris ejecting sprocket comprising a body, a plurality of teeth projecting from the body, a plurality of grooves in alternating arrangement with the teeth, each groove receives a belt tooth, a cavity disposed radially inward from each groove and communicating with the groove, the cavity further comprises a land for supporting the belt, the land disposed between the groove and the cavity, and the cavity comprising a surface disposed at an angle (θ) with respect to an axial direction.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
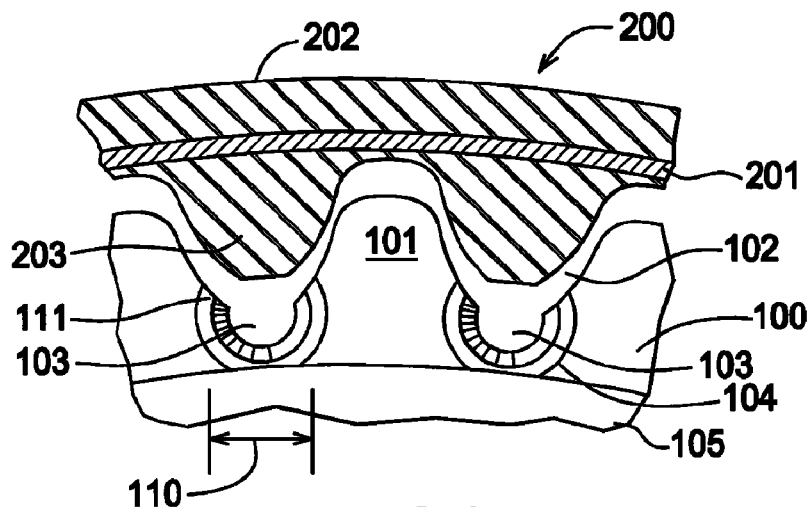
FIG. 1 is a side view of the sprocket grooves.

FIG. 1 is a side view of the sprocket grooves. A toothed belt 200 engages sprocket 100. Toothed belt 200 is also called a cogged or synchronous belt and comprises a plurality of teeth 203. Each tooth 203 extends across a width of the belt, i.e., normal to the longitudinal direction. A belt load is borne by a tensile cord 201 which runs the entire length of the endless belt. Such toothed belts are well known in the art.

Sprocket 100 comprises a body 105. Body 105 comprises plurality of teeth 101 extending radially therefrom. Each tooth 101 extends across a width of the sprocket and engages a belt groove. The sprocket also comprises grooves 102 which are alternatingly disposed between the teeth 101.

A cavity 103 is disposed radially inward from each groove 102, and as disposed below each belt tooth 203. Each cavity 103 communicates with the groove 102. Each cavity 103 comprises a frustoconical surface 104.

Surface 104 has a gradient with respect to an axial direction. Cavity 103 and surface 104 is used to eject debris entrapped between the belt tooth 203 and sprocket groove 102 during operation.

Surface 104 is substantially continuous meaning there are no gaps or openings in the surface other than through its communication to groove 102. This allows the torque bearing strength of the sprocket to be maintained wherein it might otherwise be compromised if slots or other openings where made in the sprocket body radially under the cavity 103. Sprocket 100 does not comprise a radially projected opening for ejecting debris.

Figure 2:
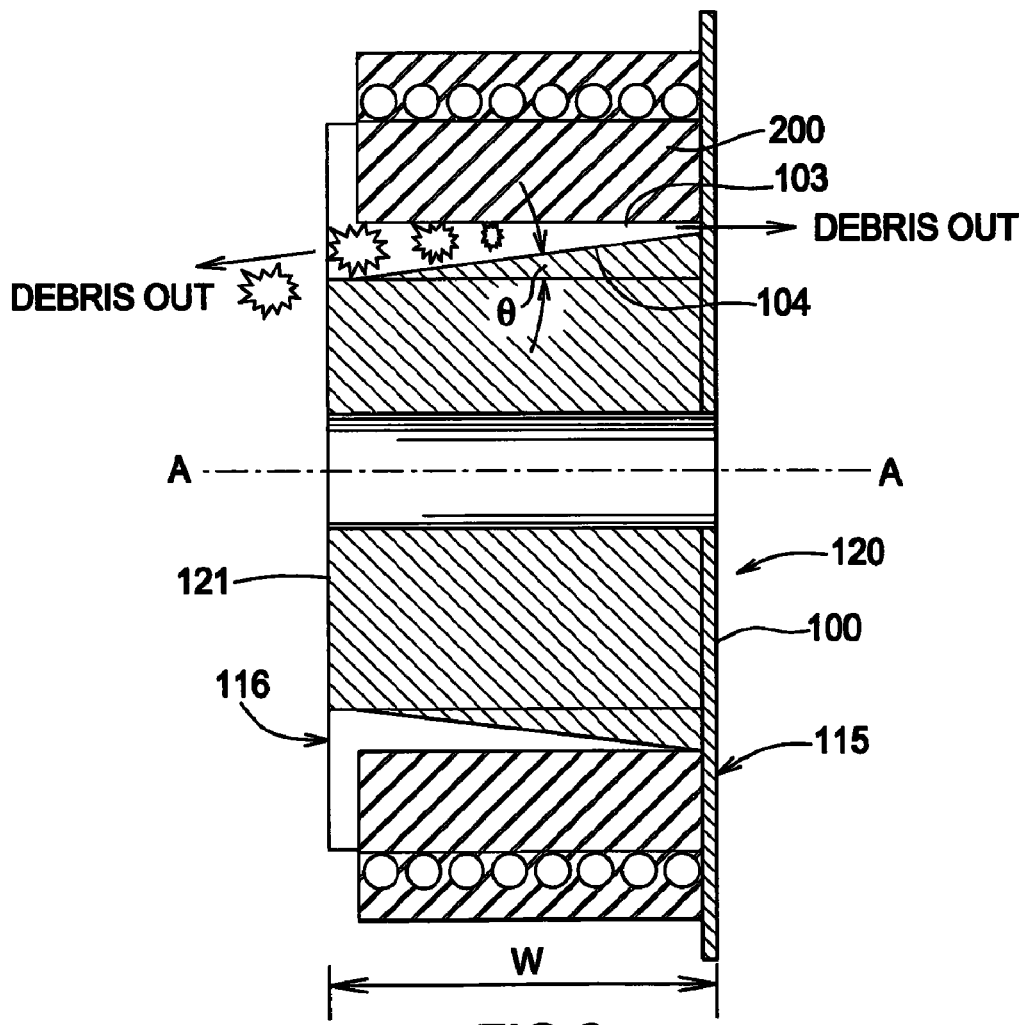
FIG. 2 is a cross-sectional view of the sprocket.

FIG. 2 is a cross-sectional view of the sprocket. Surface 104 comprises a gradient. The gradient extends with respect to an axial direction along axis A-A. Put another way the axis of the taper-like form of surface 104 is aligned with axis A-A. Axis A-A is the axis of rotation of the sprocket. The gradient of surface 104 may also be further described as an angle. Angle ($\theta$) is in the range of greater than 0° to approximately 20°, however, any gradient sufficient to eject debris from the sprocket is suitable.

Debris is shown being ejected in the direction of axis A-A from the cavity 103. Debris may be trapped between the belt and sprocket during normal operation, such as when the vehicle is being operated in muddy conditions on a trail.

Cavity 103 extends across the entire width (W) of the sprocket so that each end (115, 116) of each cavity 103 is open on each side of the sprocket (120, 121) to allow debris to exit the cavity from either end 115 or 116. In an alternate embodiment only one end (115, 116) is open.

Figure 3:
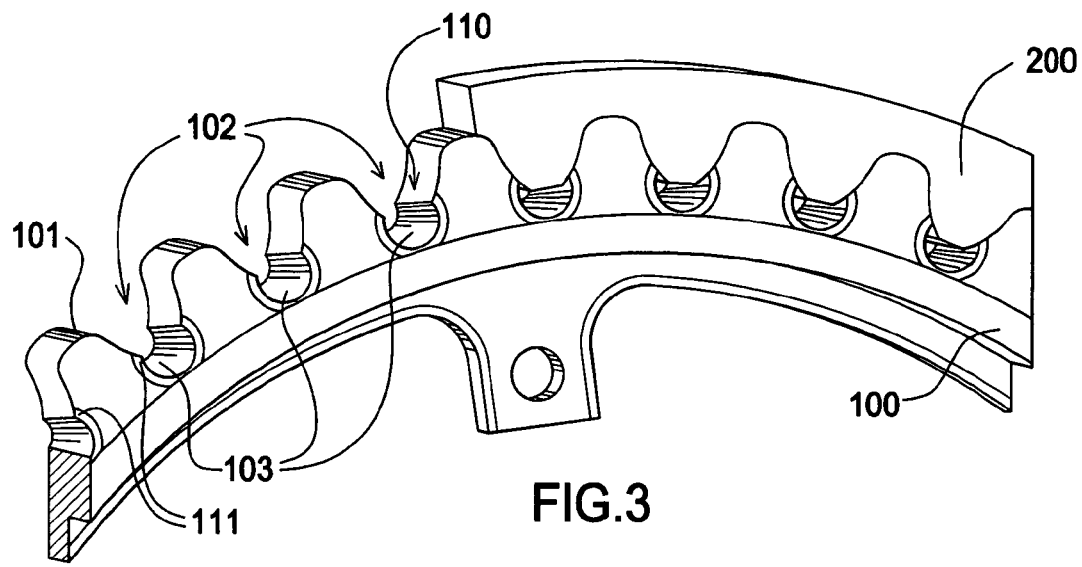
FIG. 3 is a top perspective view of the sprocket and belt.

FIG. 3 is a top perspective view of the sprocket and belt. In this figure each cavity 103 is tapered in the same direction. This means debris is typically ejected in the same direction from each cavity, for example, to one side of a bicycle. In an alternate embodiment, the taper direction for each cavity 103 can be alternated between each side of the sprocket.

Figure 4:
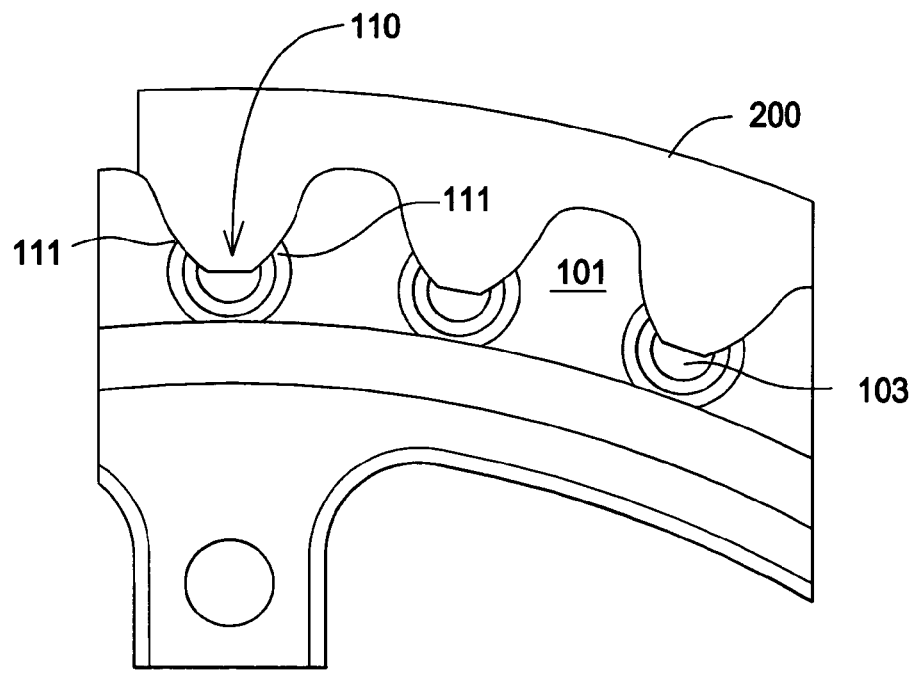
FIG. 4 is a side view of the sprocket and belt.

FIG. 4 is a side view of the sprocket and belt. Each cavity 103 has a restriction 110 where the cavity communicates with groove 102. Restriction 110 provides a landing 111 which supports tooth 203 while preventing tooth 203 from entering the cavity.

Figure 5:
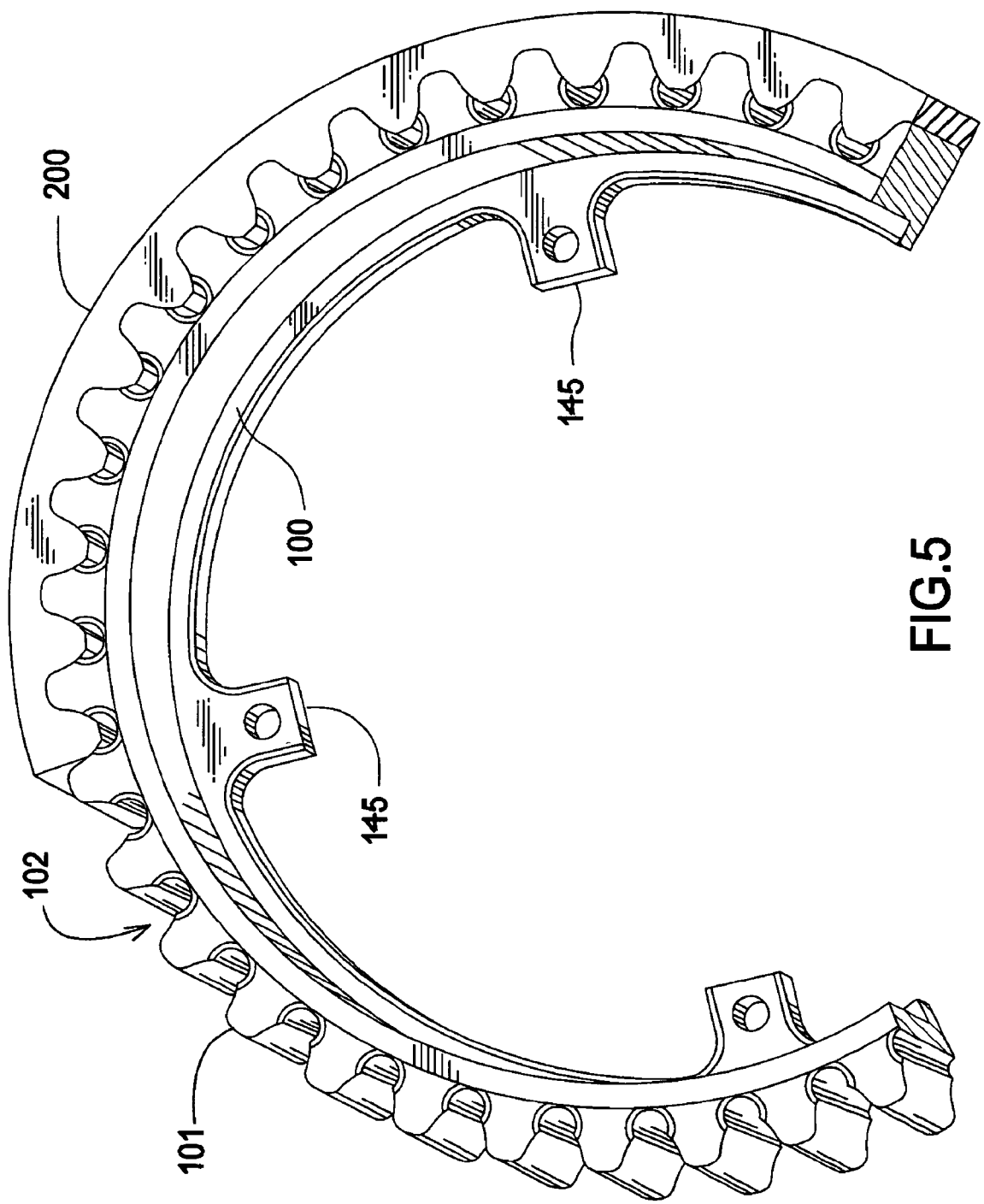
FIG. 5 is a bottom perspective view of the sprocket and belt.

FIG. 5 is a bottom perspective view of the sprocket and belt. Sprocket 100 can be connected to a driver shaft (not shown) at lugs 145 using fasteners known in the art. The inventive belt drive and sprocket may be used on bicycles, engines on other industrial applications where there is a risk of debris becoming entrapped between the belt and the sprocket.

Although a form of the invention has been described herein, it will be obvious to those skilled in the art that variations may be made in the construction and relation of parts without departing from the spirit and scope of the invention described herein.

I claim:

1. A debris ejecting sprocket comprising:
a body (100);
a plurality of teeth (101) projecting from the body;
a plurality of grooves (102) in alternating arrangement with the teeth, each groove receives a belt tooth;
a cavity (103) disposed radially inward from each groove and communicating with the groove, the cavity having an opening on each side of the sprocket;
the cavity further comprises a land (111) for supporting the belt tooth, the land disposed between the groove and the cavity; and
the cavity comprising a surface (104) disposed at an angle ($\theta$) with respect to an axial direction (A-A), the surface further comprises a frustoconical form.

2. The debris ejecting sprocket as in claim 1, wherein the cavity further comprises an open end for ejecting debris from the cavity.

3. The debris ejecting sprocket as in claim 1 wherein the angle ($\theta$) is in the range of greater than 0° up to approximately 20°.

4. A belt drive comprising:
a toothed belt;
a sprocket comprising a body;
a plurality of teeth projecting from the body for engaging the toothed belt;
a plurality of grooves, each groove receives a belt tooth;
a cavity disposed radially inward from each groove and communicating with the groove, the cavity having an opening on each side of the sprocket, the cavity having a surface having a gradient with respect to an axial direction for ejecting debris, the surface comprises a frustoconical form.

5. The belt drive system as in claim 4, wherein the cavity further comprises an opening to each side of the sprocket.

6. The belt drive system as in claim 4, wherein the surface comprises a frustoconical form.

7. The belt drive system as in claim 4, wherein the surface is continuous between each tooth.

8. The belt drive system as in claim 4 further comprising a landing such that said belt tooth cannot enter the cavity.

9. A sprocket comprising:
a body;
a plurality of teeth projecting radially from the body for engaging a belt;
a plurality of grooves interposed between the teeth, each groove receives a belt tooth;
a cavity disposed radially inward from each groove and communicating with the groove, the cavity having an opening on each side of the sprocket;
the cavity having a surface, the surface having a frustoconical form aligned with respect to an axial direction for ejecting debris, the surface having a gradient with respect to an axial direction;
the cavity having an open end on each side of the sprocket; and
the cavity further comprising a land for supporting a belt, the land disposed between the groove and the cavity.

* * * * *